United States Patent [19]

Finlay

[11] Patent Number: 4,529,784

[45] Date of Patent: Jul. 16, 1985

[54] FLUORINATED COPOLYMERS WITH IMPROVED CURE SITE

[75] Inventor: Joseph B. Finlay, Wilmington, Del.

[73] Assignee: E. I. Du Pont de Nemours and Company, Wilmington, Del.

[21] Appl. No.: 512,688

[22] Filed: Jul. 11, 1983

[51] Int. Cl.$^3$ ............................................. C08F 16/24
[52] U.S. Cl. .................................. 526/247; 525/326.3
[58] Field of Search ......................................... 526/247

[56] References Cited

U.S. PATENT DOCUMENTS

| | | | |
|---|---|---|---|
| 3,132,123 | 5/1964 | Harris et al. ........................ | 260/87.5 |
| 3,467,638 | 9/1969 | Pattison ............................... | 260/87.5 |
| 3,546,186 | 12/1970 | Gladding ............................ | 526/245 |
| 3,682,872 | 8/1972 | Brizzolara et al. ................. | 260/80.76 |
| 4,035,565 | 7/1977 | Apotheker et al. ................. | 526/249 |
| 4,131,726 | 12/1978 | Martin ................................ | 526/247 |
| 4,281,092 | 7/1981 | Breazeale ........................... | 526/247 |

*Primary Examiner*—Christopher A. Henderson

[57] ABSTRACT

Copolymers of tetrafluoroethylene and perfluoromethyl perfluorovinyl ether with a cure-site monomer of the formula $R_1CH=CR_2R_3$ wherein $R_1$ and $R_2$ are independently selected from hydrogen and fluorine and $R_3$ is independently selected from hydrogen, fluorine and alkyl or perfluoroalkyl.

5 Claims, No Drawings

FLUORINATED COPOLYMERS WITH IMPROVED CURE SITE

BACKGROUND OF THE INVENTION

Elastomeric copolymers of tetrafluoroethylene (TFE) and perfluoro(methyl vinyl) ether (PMVE) exhibit outstanding resistance to chemical attack and excellent thermal stability. For a polymer to exhibit good elastomeric properties, it is necessary that the individual polymer molecules be interconnected in such a way as to form a three-dimensional network. Usually, the interconnections, or crosslinks, are formed by chemical reaction involving two or more polymer molecules. However, because of their chemical inertness, polymers of TFE and PMVE are not readily crosslinked by ordinary means, and a third monomer is necessary to serve as the crosslinking site. The resulting terpolymer can then be fabricated into shaped articles such as o-rings, gaskets, flange seals, pump diaphragms, tubing and hoses. These products are especially useful where extraordinary resistance to heat and corrosive fluids is required.

The requirements for the third monomer and the crosslinking reaction are quite stringent. The monomer must copolymerize readily, without excessive chain-transfer or inhibition. The resulting polymer must be capable of being physically mixed, or compounded, with various curatives and other materials, using conventional mixing devices such as a two-roll rubber mill or internal rubber mixer. The compound thus prepared must be such that it can withstand the elevated processing temperatures encountered during mixing and subsequent forming into the desired shapes without curing, and nevertheless subsequently cure readily to the desired crosslinked structure. Most important, the resulting crosslinks must be comparable to the dipolymer in thermal, oxidative, and chemical resistance, in order to preserve the outstanding properties of the dipolymer.

Because of these stringent requirements, it has previously been thought that completely fluorinated curesite monomers are necessary for copolymers of TFE and PMVE, and perfluorovinyl ethers of complicated structure have been preferred. Among such materials are perfluoro-(2-phenoxypropyl vinyl) ether (Pattison, U.S. Pat. No. 3,467,638), perfluoro-(3-phenoxypropyl vinyl) ether (Brizzolara and Quarles, U.S. Pat. No. 3,682,872), and perfluoro-(8-cyano-5-methyl-3,6-dioxa-1-octene) (Breazeale, U.S. Pat. No. 4,281,092). The terpolymers of Pattison or of Brizzolara and Quarles have, however, been found difficult to process and give vulcanizates having undesireably high compression-set. The terpolymers of Breazeale, on the other hand, while better in both of these respects, give vulcanizates that are not as fluid resistant in basic organic fluids. Accordingly, a need exists for curesites which give improved handling and improved compression-set resistance on the one hand, and satisfactory resistance to organic bases on the other.

SUMMARY OF THE INVENTION

The instant invention provides an elastomeric copolymer of TFE and PMVE having a curesite monomer which results in surprisingly improved processability and curing characteristics and gives vulcanizates with excellent crosslink stability and good resistance to organic bases and other fluids. In addition, these curesite monomers copolymerize even more easily than the previously preferred perfluorovinyl ethers, are effective in extremely low concentrations, and most surprisingly of all, are, in general, simple compounds which are readily available and inexpensive.

Specifically, the instant invention provides a copolymer, the elastomeric vulcanizate of which is suitable for use where extraordinary resistance to environmental attack by corrosive liquids at elevated temperatures is required, comprising copolymerized units of:

(a) 53–79.9 mole percent tetrafluoroethylene, (b) 20–46.9 mole percent perfluoromethyl perfluorovinyl ether.

(c) 0.1–2 mole percent of a cure-site monomer of the formula $R_1CH=CR_2R_3$ wherein $R_1$ and $R_2$ are independently selected from hydrogen and fluorine and $R_3$ is independently selected from hydrogen, fluorine, alkyl and perfluoroalkyl.

DETAILED DESCRIPTION OF THE INVENTION

The tetrafluoroethylene and perfluoromethyl perfluorovinyl ether components of the present invention are prepared as described in detail in Breazeale U.S. Pat. No. 4,281,092, hereby incorporated by reference. The third component of the present copolymers, the cure-site monomers, are readily available through normal commercial channels or can be readily synthesized using standard techniques.

The cure-site monomers used in the present invention are characterized by their simplicity, and are defined by the general formula $R_1CH=CR_2R_3$ wherein $R_1$ and $R_2$ are independently selected from hydrogen and fluorine and $R_3$ is independently selected from hydrogen, fluorine, alkyl and perfluoroalkyl. While previously it was thought necessary to use complex ethers and the like for cure-site monomers, the present invention is based on the discovery that monomers as simple as ethylene can be used to advantage. The cure-site monomers used in the present invention preferably contain two carbon atoms for simplicity and ease of preparation.

Compositions falling within the above general formula include, for example $CH_2=CH_2$, $CH_2=CFH$, $CH_2=CF_2$, $CHF=CF_2$, $CH_2=CHCF_3$ and $CH_2=CHC_4F_9$. The size of the perfluoroalkyl component is not critical, and can conveniently contain up to about 12 carbon atoms. However, for simplicity of the polymer, a perfluoroalkyl component of up to 4 carbon atoms is preferred. In addition, the curesite monomer preferably has no more than three hydrogen atoms attached to the unsaturated carbon atoms, and it is especially preferred that the curesite monomer have no more than 2 hydrogen atoms. Of these various monomers, trifluoroethylene ($CHF=CF_2$) and vinylidene fluoride ($CH_2=CF_2$) have been found to be particularly satisfactory, and are therefore preferred.

The concentration of the curesite termonomer should be about 0.1–2 mol %, and preferably about 0.1–1.0 mol %. If the concentration of these hydrogen-containing monomers is too high, resistance to oxidation will suffer, as will resistance to numerous solvents and other chemicals. For many uses, the fundamental excellence of the TFE-PMVE dipolymer is satisfactorily preserved at curesite concentrations below about 2 mol %, the exact concentration varying to some extent depending on the application and on the curesite monomer itself. However, to achieve excellent resistance to certain particularly troublesome organic bases, as, for example, ethylene diamine, curesite concentrations as low as 0.1–0.4 mol % may be required, and it is surprising that concentrations this low still give the desired improvements in curing behavior and general vulcanizate properties, including compression-set.

The cure-site monomers can be copolymerized according to standard techniques. In general, the copolymers can be prepared by polymerization of the appropriate monomer mixtures with the aid of a free-radical generating initiator either in bulk, in solution in an inert solvent such as completely halogenated chloro- or fluoro- carbon or, preferably, in an aqueous emulsion system. The polymerization of the present polymers can be carried out as described, for example, in Breazeale U.S. Pat. No. 4,281,092 at column 8, lines 16–53 and especially as modified in the present Examples.

The copolymers of the present invention can be cured, or vulcanized, by a vulcanizing agent such as a dipotassium salt of Bis-phenol AF, in combination with a cyclic polyether, such as dicyclohexyl-18-crown-6. Such techniques are described in detail in Brizzolara et al. U.S. Pat. No. 3,682,872, at column 3, lines 19 to 49.

The vulcanizable perfluoro elastomer compositions can be mixed with fillers, reinforcing agents, stabilizers, plasticizers, lubricants or processing aids prior to vulcanization. The most frequently used of these is carbon black, which acts as a filler, reinforcer and light screen.

The vulcanizable copolymers of the present invention provide improved flow before vulcanization, greatly improved cure characteristics, and improved high temperature compression-set and retention of stress-strain properties after high temperature aging in air as compared to the copolymers previously known in the art, such as those described in Pattison, U.S. Pat. No. 3,467,638. In addition, the present copolymers provide improved resistance to alkaline materials in comparison to those copolymers shown in Breazeale U.S. Pat. No. 4,281,092.

The present invention is further illustrated by the following specific examples, in which parts and percentages are by weight unless otherwise indicated.

EXAMPLE 1 AND CONTROL EXAMPLE A

A terpolymer was prepared from tetrafluoroethylene, perfluoro(methyl vinyl) ether and trifluoroethylene.

The polymer was prepared in a 4 liter mechanically agitated, water-jacketed, stainless-steel autoclave operated continuously at 90° C. and 4800 kPa, into which was pumped, at the rate of 1000 ml/hr, an aqueous polymerization medium/initiator solution comprising 1000 mL water, 3.75 g ammonium persulfate, 12.5 g disodium hydrogen phosphate heptahydrate, and 21 g ammonium perfluorooctanoate ("Fluorad" FC-143, 3M Co.). At the same time, tetrafluoroethylene (300 g/h), perfluoro(methyl vinyl) ether (250 g/h) and trifluoroethylene (3.5 g/h) were fed to the autoclave at a constant rate by means of a diaphragm compressor. Polymer latex was removed continuously by means of a let-down valve and unreacted monomers were vented. The latex, from 23.5 hours operation, 36.5 kg, was added with stirring to a preheated (95° C.) coagulating solution consisting of 1 kg magnesium sulfate heptahydrate in 19 gal water. The coagulated crumb was filtered off, washed repeatedly and dried by heating in an oven at 110° C. for 24 hours in the presence of air. The dried polymer weighed 11.65 kg and had the composition tetrafluoroethylene 58.0, perfluoro(methyl vinyl) ether 41.3, trifluoroethylene 0.7 (1 mol %). Monomer conversions were TFE 96%, PMVE 82% and $CF_2=CFH$ 90%. The inherent viscosity of the polymer was 0.77 dl/g. Inherent viscosity was determined at 30° C. using 0.2 g polymer per deciliter of a solvent mixture comprising (by volume) 60 parts 2,2,3-trichloroheptafluorobutane, 40 parts perfluoro(butyltetrahydrofuran) and 3 parts diethylene glycol dimethyl ether. The Mooney viscosity of the polymer was 106 as measured after 10 minutes at 150° C., using the large rotor.

The resulting terpolymer was mixed on a 2-roll rubber mill with (phr) PbO 4, dipotassium salt of Bisphenol AF 3, 18-crown-6 3.5, and shaped and cured for 30 minutes in a press at 177° C., and postcured unrestrained under nitrogen in an oven according to the following schedule: 6 hours to 204° C., 204° C. for 12 hours, 204 to 288° C. over 6 hours, and 18 hours at 288° C. Some of the parts were subsequently heated 2 days in a circulating air oven maintained at 316° C. before testing as an indication of stability to heat and oxidation.

In Control Example A, a polymer was prepared incorporating the perfluoro(2-phenoxypropyl vinyl) ether curesite of Pattison, U.S. Pat No. 3,467,638. The equipment and general procedures of Example 1 were used.

The temperature was 70° C. and the pressure was 4100 kPa. TFE and PMVE feeds were 275 g/h and 300 g/h, and perfluoro(2-phenoxypropyl vinyl) ether was pumped in at 12.2 g/h. Two aqueous feeds, A and B, were employed, both having been fed at the rate of 0.5 L/h. A contained, per 0.5 L water, 7.2 g ammonium persulfate, 15 g ammonium perfluorooctanoate, and 5.5 g disodium hydrogen phosphate heptahydrate. B contained 5.9 g sodium sulfite per 0.5 L water. The polymer obtained had the composition 55.4% TFE, 42.8% PMVE, 1.8% perfluoro(2-phenoxypropyl vinyl) ether, as determined by infrared analysis and was produced at the rate of about 460 g/h. The inherent viscosity of the polymer was 0.67 dL/g. The polymer of the Control Example was compounded, cured, postcured and heat aged in the same manner as the copolymer of the present invention.

Average results obtained over several months of testing polymers prepared as in Example 1 were compared to those obtained with the polymers of Control Example A, and the results are summarized in Table I. In this and subsequent examples, stress-strain properties were determined as described in ASTM Method D412, while compression-set was determined by ASTM-D-395, Method B, using either pellets 1.12 cm thick and 1.68 cm in diameter or AS-568A No. 214 o-rings which are 2.0 cm in internal diameter and have a cross-section diameter of 0.353 cm.

The compression-set was further compared under various other conditions, and the results are in Table II. The terpolymers of the present invention exhibit superior performance.

TABLE I

| COMPARISON OF VULCANIZATE PROPERTIES | | |
|---|---|---|
| | Example | |
| | 1 | Control A |
| Stress-Strain Properties Post Cured | | |
| Stress at 100% Strain, MPa | 9.4 | 9.3 |
| Tensile Strength at Break, MPa | 15.4 | 16.9 |
| Elongation at Break, % | 140 | 150 |
| Aged in Air 2 days at 316° C. | | |
| Stress at 100% Strain, MPa | 6.7 | 6.3 |
| Tensile Strength at Break, MPa | 15.0 | 15.4 |

TABLE I-continued
COMPARISON OF VULCANIZATE PROPERTIES

| | Example | |
|---|---|---|
| | 1 | Control A |
| Elongation at Break, % | 215 | 230 |
| % Retained after aging at 316° C. | | |
| Stress at 100% Strain | 71 | 67 |
| Tensile Strength at Break, | 97 | 91 |
| Elongation | 153 | 153 |
| Compression Set, 70 h/204° C., % | | |
| Post Cured | | |
| Pellet | 18 | 47 |
| O-Ring | 20 | 59 |
| Aged in Air 2 days at 316° C. | | |
| Pellet | 25 | 75 |
| O-Ring | 40 | 91 |

TABLE II
Compression-Set Under Various Conditions

| | Example 1 | | Control Example A | |
|---|---|---|---|---|
| | pellet | o-ring | pellet | o-ring |
| Compression-set at 204° C., % | | | | |
| 70 hours | 20 | 21 | 46 | 53 |
| 7 days | 26 | 26 | 58 | 60 |
| 14 days | 32 | 35 | 65 | 63 |
| Compression-set at 232° C., % | | | | |
| 70 hours | 23 | 28 | 46 | 57 |
| 7 days | 28 | 32 | 51 | 61 |
| 14 days | 34 | 42 | 64 | 67 |

EXAMPLE 2

A terpolymer was prepared from tetrafluoroethylene, perfluoro(methyl vinyl) ether, and vinylidene fluoride using the equipment and general procedures of Example 1.

Monomer feeds were: TFE, 300 g/h, PMVE, 250 g/h, and $CH_2=CF_2$, 1.1 g/h. The aqueous initiator/polymerization medium was fed continuously at the rate of 1.0 L/h, and contained 2.8 g ammonium persulfate, 9.4 g ammonium perfluorooctanoate, and 6.9 mL ammonium hydroxide (29% NH3) per liter water. The autoclave was operated at 90° C. and 4800 kPa pressure. The latex from about 3.6 hours operation was added with stirring to a hot (ca. 90° C.) solution comprising about 20 L water, 50 mL conc. nitric acid, and 30 g benzyl triphenyl phosphonium chloride. The coagulated polymer was filtered off and washed and dried as in Example 1, and weighed 1640 g, for a production rate of about 450 g/h. The polymer composition was 60.4 TFE, 39.4 PMVE, 0.21 $CH_2=CF_2$ (0.37 mol %) as determined by IR analysis, and the inherent viscosity was 0.49 dl/g. The polymer was compounded, press-cured, and oven-cured as in Example 1, except that 4.0 phr dicyclohexyl-18-crown-6 was used in place of 3.5 phr 18-crown-6, and the press cure was 30 min. at 190° C. A polymer of Control Example A was compounded, cured, post-cured, and tested in the same way in a side-by-side comparison. The results are summarized in Table III. The TFE/PMVE/$CH_2=CF_2$ polymer shows greatly improved curing behavior, in comparison to the control polymer, having greatly reduced ODR minimum viscosity, indicating easier flow under stress, and more than five-fold increase in crosslink formation, as indicated by Δ-torque. The expected improvement in compression-set and retention of tensile strength after air-oven aging was also observed. While exposure to ehtylene diamine resulted in somewhat weight gain, property retention was nevertheless better than that of the control.

TABLE III

| Polymer | $CH_2=CF_2$ Curesite Example 2 | Control Example A |
|---|---|---|
| ODR, 12 min. 190° C. | | |
| Minimum value, N m | 0.79 | 1.78 |
| Δ-Torque, N m | 2.11 | 0.40 |
| $ts_2$, minutes | 2.7 | 5.6 |
| Stress-Strain 25° C. $(M100/T_B/E_B)^1$ | | |
| Post Cured | 11.7/15.8/130 | 8.1/13.2/130 |
| Air-Aged 2da 316° C. | 7.8/13.4/195 | 3.6/10.3/250 |
| Air-Aged 4da 316° C. | 6.2/10.7/285 | 2.7/3.8/330 |
| Compression-Set, "B", 70 h/204° C., % (Pellet/o-ring) | | |
| Post Cured | 34/28 | 52/69 |
| Air-Aged 2da 316° C. | 34/28 | 81/81 |
| Air-Aged 4da 316° C. | 36/54 | 94/94 |
| Ethylene Diamine Exposure 72 h/90° C. | | |
| Weight gain, % | 15 | 7 |
| $M_{100}/T_B/E_B$ 1,2 | 9.0/9.6/120 | —/6.2/90 |

$^1M_{100}$ and $T_B$ units are MPa; $E_B$ is in %.
$^2$Sample redried to remove absorbed amine before measuring.

EXAMPLES 3-5 AND CONTROL EXAMPLE B

In Examples 3-5, polymers with various concentrations of $CF_2=CH_2$ as a curesite monomer were prepared and compounded, cured, and post-cured as in Example 1. These were tested with particular reference to compression-set and resistance to basic organic media as exemplified by ethylene diamine. In Table IV, the results are compared to those obtained with polymer of Control Example A having the perfluorophenoxyvinyl ether of U.S. Pat. No. 3,467,638 and with polymer having the perfluoro-(8-cyano-5-methyl-3,6-dioxa-1-octene) as curesite, said polymer having been prepared according to the teachings of U.S. Pat. No. 4,281,092, Example 2 (Control Example B).

Compression-set is affected surprisingly little by curesite concentration, and the retention of strength by the polymer having the lowest curesite concentration after ethylene diamine exposure is particularly notable in comparison to the control having the nitrile curesite. A dipolymer having no curesite whatever was also prepared and tested. As expected, the parts became distorted during post cure and gave compression-set values of greater than 100%.

TABLE IV

| Example | 3 | 4 | 5 | Control A | Control B |
|---|---|---|---|---|---|
| Curesite Conc (mol %) | 1.1 | 0.7 | 0.2 | 0.5 | 0.4 |
| Compression-set, "B", 70 h/204° C., pellets, % | | | | | |
| Post-cured | 16 | 19 | 26 | 40 | — |
| Air-aged 14 da 275° C. | 21 | 19 | 25 | 73 | — |
| Air-aged 28 da 275° C. | 30 | 32 | 30 | 77 | — |
| Exposure to Ethylene diamine 72 h/90° C. | | | | | |
| Weight gain, % | 18.4 | 13.5 | 7.6 | 4.9 | 21.0 |
| Affect on Stress-Strain properties | | | | | |
| Before Exposure | | | | | |
| $M_{100}$, MPa | 13.1 | 11.0 | 9.3 | 11.2 | 5.2 |
| $T_B$ MPa | 17.9 | 16.5 | 18.9 | 22.0 | 14.5 |
| $E_B$ % | 130 | 135 | 155 | 145 | 180 |
| After Exposure | | | | | |
| $M_{100}$, MPa | — | — | 7.6 | 14.5 | 1.7 |
| $T_B$ MPa | 9.4 | 10.8 | 16.2 | 21.1 | 2.1 |

TABLE IV-continued

| Example | 3 | 4 | 5 | Control A | Control B |
|---|---|---|---|---|---|
| $E_B$ % % Retained | 20 | 80 | 180 | 120 | 200 |
| $M_{100}$ | — | — | 82 | 129 | 33 |
| $T_B$ | 72 | 65 | 86 | 95 | 15 |
| $E_B$ | 15 | 59 | 116 | 83 | 110 |

EXAMPLES 6-9

Terpolymers of tetrafluoroethylene, perfluoro (methyl vinyl) ether, and various curesite monomers, were prepared in Examples 6-9. The monomers as indicated in Table V were incorporated as curesites, using the polymerization procedure of Example 1. After compounding, press-curing, and oven post-curing as in Example 1, the vulcanizates were tested, with the results shown in Table V. Useful properties were obtained in every case, and crosslink stability as measured by compression-set is superior to that of the control in all cases but one.

TABLE V

| Example | 6 | 7 | 8 | 9 | A |
|---|---|---|---|---|---|
| Curesite | $CH_2=CH_2$ | $CH_2=CHF$ | $CH=CH$<br>$\vert$<br>$CF_3$ | $CH_2=CH$<br>$\vert$<br>$C_4F_9$ | U.S. Pat. No. 3,467,638 |
| Concentration (mol %) | 0.9 | 0.9 | 2.2 | 0.9 | 0.5 |
| Stress-Strain, 25° C. | | | | | |
| $M_{100}$ MPa | 9.1 | 9.3 | | 10.5 | 9.2 |
| $T_B$ MPa | 17.4 | 14.6 | 11.4 | 14.8 | 16.5 |
| $E_B$ % | 180 | 180 | 85 | 150 | 150 |
| Compression-Set "B" 70 hours 204° C., % | | | | | |
| pellet | 68 | 35 | 42 | 28 | 47 |
| o-ring | 66 | 38 | 32 | 22 | 59 |

I claim:

1. A copolymer, the elastomeric vulcanizate of which is suitable for use where extraordinary resistance to environmental attach by corrosive liquids at elevated temperatures is required, comprising copolymerized units of:
   (a) 53-79.9 mole percent tetrafluoroethylene,
   (b) 20-46.9 mole percent perfluoromethyl perfluorovinyl ether, and
   (c) 0.1-2 mole percent of a cure-site monomer of the formula $R_1CH=CR_2R_3$ wherein $R_1$ and $R_2$ are independently selected from hydrogen and fluorine and $R_3$ is independently selected from hydrogen, fluorine and alkyl or perfluoroalkyl and wherein the cure site monomer has no more than 3 hydrogen atoms attached to the unsaturated carbon atoms.

2. A copolymer of claim 1 where the concentration of curesite monomer is about 0.1-1.0 mol %.

3. A copolymer of claim 1 wherein the curesite monomer has no more than 2 hydrogen atoms.

4. A copolymer of claim 1 wherein the curesite monomer consists essentially of vinylidene fluoride.

5. A copolymer of claim 1 wherein the curesite monomer consists essentially of trifluoroethylene.

* * * * *